United States Patent
Neuman (10) Patent No.: US 7,600,143 B1
(45) Date of Patent: Oct. 6, 2009

(54) METHOD AND APPARATUS FOR VARIABLE DELAY DATA TRANSFER

(75) Inventor: Paul S. Neuman, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 331 days.

(21) Appl. No.: 10/922,214

(22) Filed: Aug. 19, 2004

(51) Int. Cl.
*G06F 1/04* (2006.01)

(52) U.S. Cl. ...................................................... 713/500

(58) Field of Classification Search .................. 713/500
See application file for complete search history.

(56) References Cited

U.S. PATENT DOCUMENTS

| | | | | |
|---|---|---|---|---|
| 5,509,038 A | * | 4/1996 | Wicki | 375/371 |
| 6,167,528 A | * | 12/2000 | Arcoleo | 713/501 |
| 6,418,176 B1 | * | 7/2002 | Ho et al. | 375/372 |
| 6,486,721 B2 | * | 11/2002 | Greenstreet et al. | 327/211 |
| 6,735,732 B2 | * | 5/2004 | Yamada | 714/744 |

* cited by examiner

*Primary Examiner*—Thomas Lee
*Assistant Examiner*—Eric Chang
(74) *Attorney, Agent, or Firm*—Robert P. Marley; Hollingsworth & Funk, LLC (57) ABSTRACT

A method and apparatus allows data to traverse a cache interface device in one of four transfer modes. A fast bypass mode provides received cache data within the same master clock cycle as it was received, whereas a slow bypass mode provides received cache data within the subsequent master clock cycle. A queue mode provides a programmable amount of delay to be used by the cache interface device, whereby consecutive queue mode provides a First In First Out (FIFO) operation to consecutively retrieve queued data. A block queue mode, on the other hand, provides a method to retrieve queued data using a programmable offset so as to enable partial cache line retrieval without the need to use No Operation (NoP) clock cycles on the cache interface data bus.

16 Claims, 9 Drawing Sheets

METHOD AND APPARATUS FOR VARIABLE DELAY DATA TRANSFER

FIELD OF THE INVENTION

The present invention relates in general to data transfer control, and more particularly, to varying delay data transfer.

BACKGROUND OF THE INVENTION

Advances in the computing, telecommunications, and other electrical arts continue to demand increased data throughput and decreased data latency from their constituent subsystems. As designs for these subsystems tend towards a modular approach, however, data transfer and associated data control between each module tends to not only decrease data throughput, but also increase data latency. One such modular system may be exemplified by the Cellular MultProcessing (CMP) architecture, which is used in today's high end computing platforms. CMP employs a Symmetric Multiprocessor (SMP) design, which further employs multiple modular components, such as high throughput memory, Input/Output (I/O) systems, and supporting hardware elements to bring about the manageability and resilience required by these computing architectures.

As with any modular design, however, SMP systems are faced with the daunting task of managing large quantities of asynchronous data transfer between their associated processors, cache, and system memory. Data transfer between, for example, one processor to another generally requires the use of a data cache and an associated data interface. The amount of data transferred between the data interfaces, however, is not a constant value, but is rather dependant upon the particular type of data transfer taking place.

For example, a continuous data transfer may pertain to a data block, e.g., cache line, where each data byte of the cache line is transferred in contiguous order using sequential address clocking. Conversely, a data interface may also transfer partial cache lines, whereby a variable number of data bytes are transferred for each cache line. Prior art data interfaces, however, add delay to the partial cache line transfer, due to the additional addressing clock cycles that are needed to synchronize the data interface to the beginning of the next cache line. In other words, the non-transferred data bytes of each cache line are "skipped over" by executing a No Operation (NoP) for each address clock cycle associated with the non-transferred data bytes. Thus, each NoP necessarily decreases data throughput and data latency by adding the delay necessary to synchronize the data interfaces.

A need exists, therefore, to provide a method and apparatus that allows a variable delay data interface that provides on-demand output data without adding latency or dead cycles.

SUMMARY OF THE INVENTION

The present invention is directed to a method and apparatus that allows data to traverse a data interface device in one of four transfer modes. A fast bypass mode provides received data within the same master clock cycle as it was received, whereas a slow bypass mode provides received data within the subsequent master clock cycle. A queue mode provides a programmable amount of delay to be used by the data interface device, whereby a consecutive queue mode provides a First In First Out (FIFO) operation to consecutively retrieve queued data. A block queue mode, on the other hand, provides a method to retrieve queued data using a programmable offset so as to enable partial cache line retrieval.

In accordance with one embodiment of the invention, a method of data transfer provides programmable delay by receiving a data block at a first instant in time within a first master clock cycle, determining one of a plurality of master clock cycles to be used as a second master clock cycle, transmitting the received data block at a second instant in time within the second master clock cycle, and providing a programmable amount of delay to facilitate storage of the received data block for a time equal to a difference between the first and second instants in time.

In accordance with another embodiment of the invention, a multiprocessor system comprises a plurality of multiprocessors sharing a common system bus with access to a common memory pool and a node controller that is coupled to each of the plurality of multiprocessors to facilitate data transfer between the plurality of multiprocessors and the common memory pool. The node controller comprises a data transfer interface adapted to programmably buffer data blocks transferred between the plurality of multiprocessors and the common memory pool and a transaction processor coupled to the data transfer interface and adapted to control an amount of time that the data blocks remain buffered in the data transfer interface.

In accordance with another embodiment of the invention, a buffer comprises a plurality of data paths coupled to transfer data received at an input of the buffer to an output of the buffer. The buffer further comprises a plurality of registers interconnecting the plurality of data paths and the registers are coupled to receive a plurality of clock signals each out of phase with one another. Still further, the buffer comprises a plurality of multiplexers adapted to select one of the plurality of data paths in response to external control signals. The data path is selected in response to an amount of required transfer delay.

DETAILED DESCRIPTION

Figure 1:
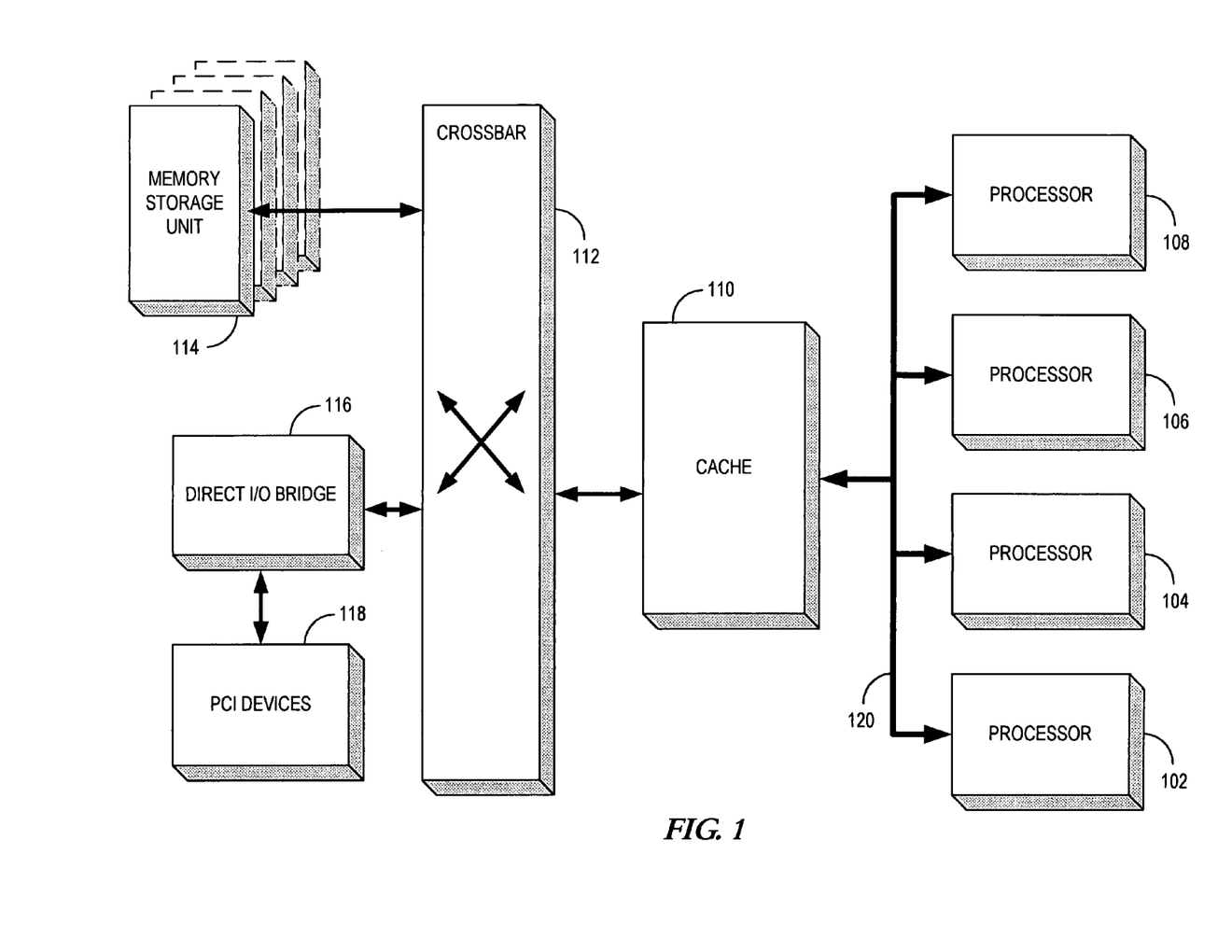
FIG. 1 illustrates a block diagram of a processing cell that exemplifies and application that may be advantaged by the present invention.

The present invention presents a method and apparatus of moving data across a modular electronic component, such as an Application Specific Integrated Circuit (ASIC), without adding latency or dead cycles to the data path through the ASIC. ASICs may be used in virtually any application, where data transfer and manipulation is required. One such application exists within an SMP architecture of today's high end computing designs, whereby modular processing cells, as exemplified in FIG. 1, are combined to increase data throughput and storage capacity of the SMP architecture. Data transfer within the ASICs employed by the processing cell is enhanced through application of the benefits provided by the present invention.

The processing cell of FIG. 1 is comprised of multiple Central Processing Units (CPU) 102-108, hereinafter referred to as processors, and a corresponding Cache 110 that is shared through Bus 120. Memory Storage Units 114 provide a shared memory pool for processors 102-108 through non-blocking Crossbar 112. Direct IO Bridge 116 provides high-throughput access to Peripheral Component Interconnect (PCI) devices 118. Cache 110 has a dedicated, direct connection to each of Memory Storage Units 114 that is supported by Crossbar 112. Memory Storage Unit 114 has a typical design, such that each Memory Storage Unit 114 may handle hundreds of access requests concurrently. Even higher performance may be realized by allowing interleaving between each Memory Storage Unit 114, where interleaving enables data to be spread across all Memory Storage Units 114 for future parallel access by any one or all of processors 102-108 and/or Cache 110.

Figure 2:
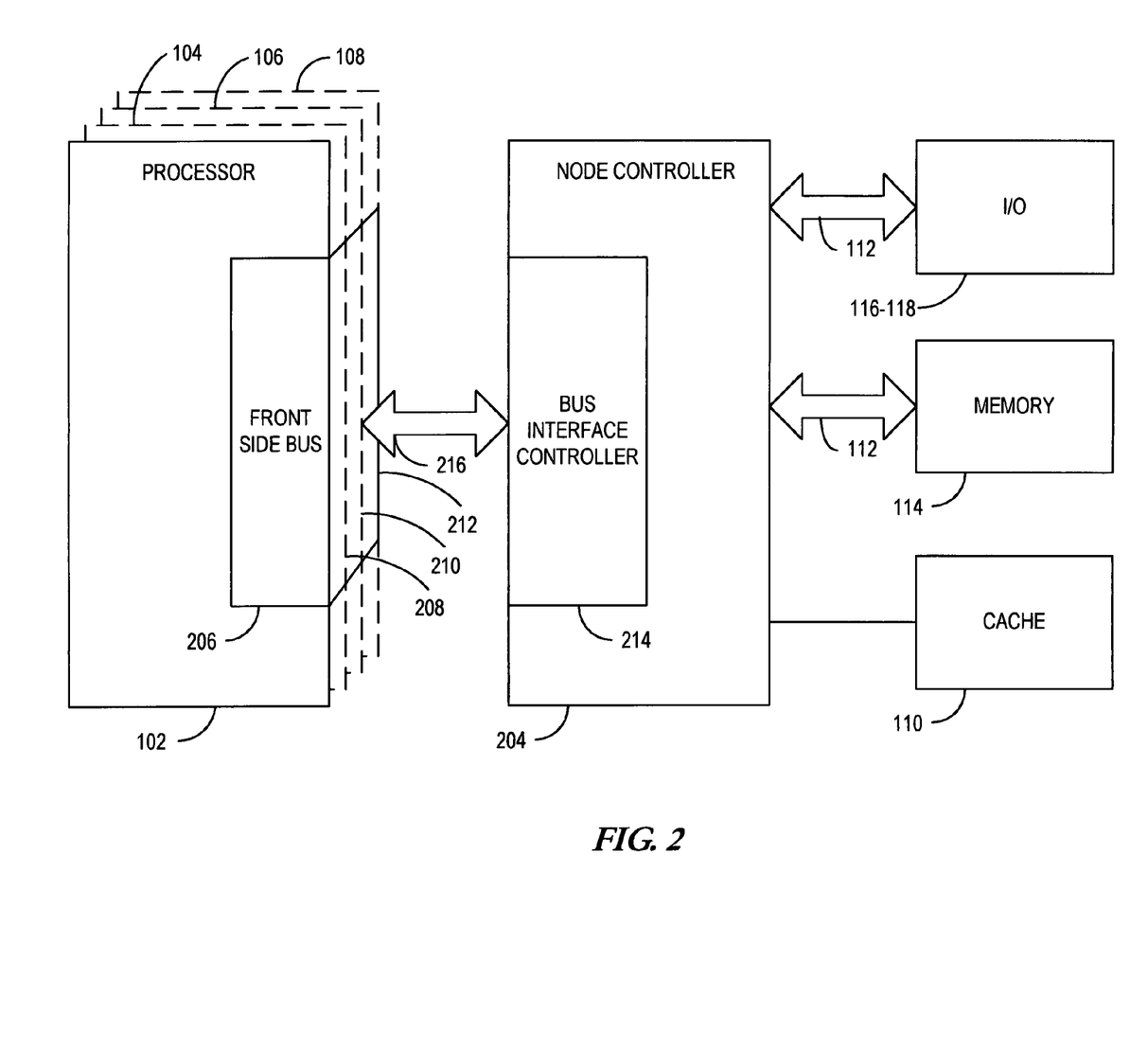
FIG. 2 illustrates a block diagram of the bus interaction of the processing cell of FIG. 1.

FIG. 2 illustrates a detailed block diagram exemplifying bus components, e.g., Front Side Bus 206-212, within Processors 102-108, respectively, and the associated bus controller, e.g., Node Controller 204, that is required to negotiate data transfer between Processors 102-108, I/O 116-118, Memory 114, and Cache 110. Node Controller 204 provides Bus Interface Controller 214 and the cache controller for Processors 102-108 operating on System Bus 216. Node Controller 204 may be implemented as an ASIC and it is the central agent on the processor system bus to allow transfer between Processors 102-108, Cache 110, Memory 114, and I/O 116-118.

In operation, Node Controller 204 decodes Front Side Bus 206-212 transactions on System Bus 216 into two main types: coherent memory requests; and non-coherent requests. Memory within a multiprocessor system in which every memory read and every memory write is instantly known by each processor within the system is known as coherent memory access. Coherent memory access, therefore, must communicate the memory accessed by one processor to the other processors on the bus through the use of a bus snooping function, so that stale data is not used. Coherent memory requests on System Bus 216 are monitored by the bus snooping function and communicated to all Processors 102-108 on System Bus 216. The non-coherent requests, on the other hand, correspond to requests such as memory-mapped I/O, interrupts, and other special transactions which do not use Cache 110.

The number of Processors 102-108 operating in conjunction with Node Controller 204 is advantageously limited in order to avoid excessive bus contention on System Bus 216. Data transfer on System Bus 216 may be implemented on varying width buses to include 32, 64 and 128 bit buses and beyond. The clocking rate on System Bus 216 is usually in the range of several hundred MegaHertz (MHz) and data may be transferred on both the rising and falling edges for double-pumped operation of the system bus clock to achieve an effective System Bus 216 bandwidth of several GigaHertz (GHz). In addition, varying phases of the system bus clock may be used to implement even higher effective bus clock rates, such as providing two rising edges and two falling edges within a clock period for a quad-pumped operation of the system bus clock. Thus, it can be seen that data transfer on the bus architecture exemplified in FIG. 2 may be enhanced by the present invention, whereby data transfer delays are advantageously controlled, thus increasing data throughput and decreasing data latency.

Figure 3:
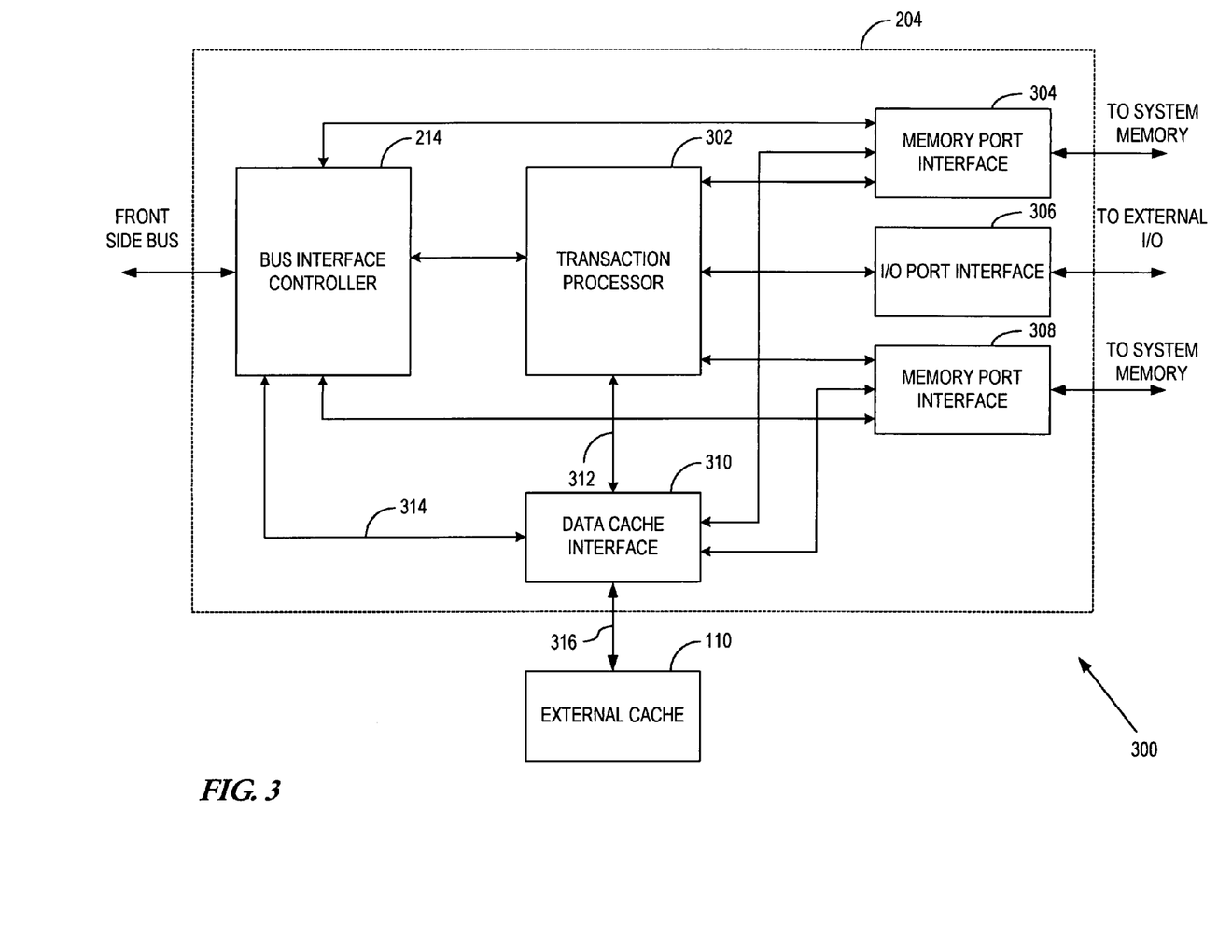
FIG. 3 illustrates an exemplary block diagram of the node controller of FIG. 2.

Block diagram 300 of FIG. 3 illustrates the main portions of Node Controller 204 that provides data I/O and control logic between: Memory Port Interface 304/308 and system memory, e.g., Memory Storage Unit 114 of FIG. 1; I/O Port Interface 306 and external I/O devices, e.g., PCI devices 118 of FIG. 1; and Data Cache Interface 310 and External Cache 110. External Cache 110 may be divided up into several banks, e.g., an "even" bank and an "odd" bank. Data transfer between External Cache 110 and the front side bus is facilitated through Bus Interface Controller 214 and Data Cache Interface 310 via Data Bus 314. The control signals that manage the data transfer between External Cache 110 and the front side bus are generated by Transaction Processor 302 via Control Bus 312.

Data transfer between Bus Interface Controller 214 and Cache Data Bus 316 may or may not be in phase synchronization. That is to say that data clocked onto Cache Data Bus 316 during one master clock cycle, may or may not appear on Data Bus 314 at some point during that same cycle. Similarly, data clocked onto Data Bus 314 during one master cycle, may or may not appear on Cache Data Bus 316 at some point during that same master clock cycle. Thus, a considerable time lag may exist between the time when data to/from External Cache 110 is made available from/to the front side bus. In accordance with one embodiment of the present invention, therefore, Data Cache Interface 310 operates to provide a programmable amount of delay that may be necessary to accommodate a data storage mechanism, which stores cache lines from/to External Cache 110 until the cache lines are ready to be presented to/from the front side bus.

Figure 4:
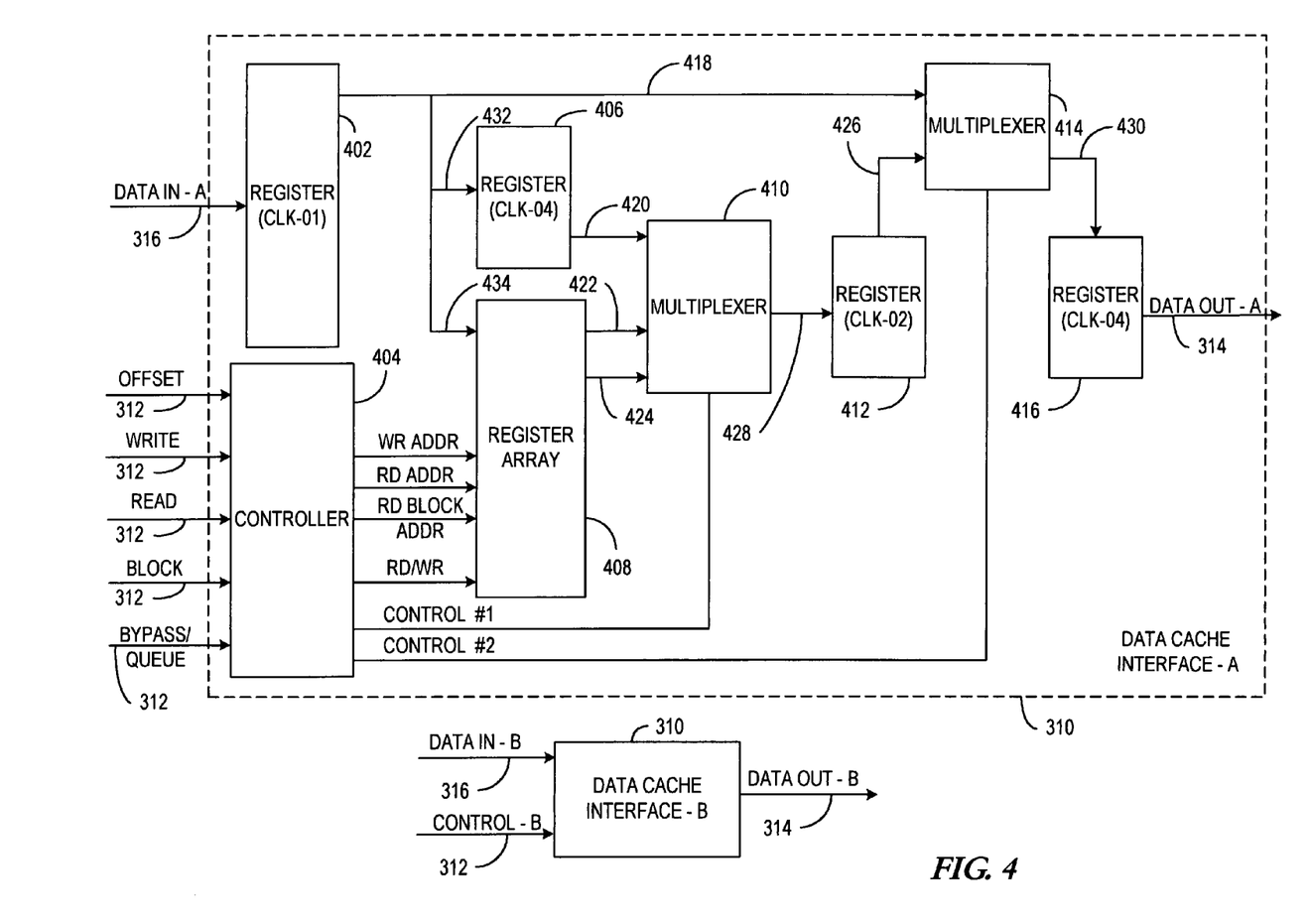
FIG. 4 illustrates an exemplary data cache interface in accordance with the present invention.

FIG. 4 represents an exemplary embodiment of Data Cache Interface 310 in accordance with the present invention, whereby a parallel data cache interface having "double-wide" data capability is exemplified. A detailed view of the data cache interface is exemplified by Data Cache Interface-A 310, whereas the second Data Cache Interface 310-B is shown in block format for completeness. It should be noted that the present invention is equally applicable in cache data management systems that do not employ parallel data paths, but rather offer only single data paths for cache access. For purposes of illustration, a single data direction will be discussed in relation to FIG. 4, with the understanding that Data Cache Interface 310 is operative to facilitate bi-directional data transfer.

In one embodiment, signal DATA IN-A represents portions of cache lines, e.g., 128 bit data blocks, retrieved from External Cache 110 of FIG. 3 via Cache Bus 316. Additionally, signal DATA OUT-A represents portions of cache lines, e.g., 128 bit data blocks, provided to Bus Interface Controller 214 via Data Bus 314 to be ultimately applied to the front side bus. A cache line may be defined to be a data block that represents any number of data bytes, e.g., 128 data bytes, which may consist of 1024 bits of data, whereby each 128 bit block of data may be separately addressed. Thus, for each cache line, there exists 8 address words, each of which is capable of addressing a separate 128 bit block of data within the cache line.

A second data cache interface, e.g., Data Cache Interface-B 310, exemplifies the second half of a "double-wide" data cache interface according to one embodiment of the present invention. That is to say, for example, that while Data In-A bus 316 may constitute a 128 bit-wide cache bus, a second 128 bit-wide cache bus, e.g., Data In-B 316, may also exist, such that the width of the cache bus is doubled when both are considered in parallel. In such a scenario, for example, data may be transferred by Data Cache Interface-A 310 during a first half of a master clock cycle, while data may be transferred by Data Cache Interface-B 310 during a second half of the master clock cycle. Operation of Data Cache Interface 310 is only explained, however, in relation to Data Cache Interface-A 310, since one of ordinary skill in the art may readily apply the explained operation to Data Cache Interface-B 310.

Data Cache Interface 310 operates in two modes: bypass mode and queue mode. In bypass mode, a fast bypass data path facilitates data transfer from Cache Bus 316 to Data Bus 314 in a single master clock cycle. The fast bypass mode data path traverses Data Cache Interface 310 via data buses 316, 418, 430, and 314, whereby data bus 418 is selected by Multiplexer 414 via signal Control #2 from Controller 404. As discussed below in relation to the timing diagram 500 of FIG. 5, Registers 402 and 416 provide separate latching mechanisms that are operative during first and fourth clock phases of a single master clock cycle during fast bypass mode.

A second data path is provided during slow bypass mode, facilitating data transfer from Cache Bus 316 to Data Bus 314 in back to back master clock cycles. In slow bypass mode, for example, a 128 bit portion of a cache line latched by Register 402 during a first master clock cycle, is latched at the output of Register 416 during the next master clock cycle. The slow bypass mode data path traverses Data Cache Interface 310 via data buses 316, 432, 420, 428, 426, 430, and 314, whereby Multiplexer 410 selects data bus 420 via signal Control #1 and Multiplexer 414 selects data bus 426 via signal Control #2. As discussed below in relation to the timing diagram 600 of FIG. 6, Registers 402 and 406 provide separate latching mechanisms that are operative during the first and fourth clock phases, respectively, of a first master clock cycle, while registers 412 and 416 provide separate latching mechanisms that are operative during the second and fourth clock phases, respectively, of a second master clock cycle. Thus, in slow bypass mode, a data throughput having a delay substantially equal to one complete master clock cycle is facilitated.

In queue mode of operation, third and fourth data paths are provided within Data Cache Interface 310 to implement variable delay data paths as required. The third data path traverses Data Cache Interface 310 via data buses 316, 434, 422, 428, 426, 430, and 314, while the fourth data path traverses Data Cache Interface 310 via data buses 316, 434, 424, 428, 426, 430, and 314. Third and fourth data paths utilize, for example, a three-port queue device, e.g., Register Array 408, which accepts input data from Data Bus 434 and provides output data to either of Data Buses 422 or 424 based upon the combination of RD ADDR/RD BLOCK control signals, and the RD/WR clock signal from Controller 404.

Register Array 408 may be of any storage depth, e.g., an 18 cache line depth, each of which are then write addressable via control signal WR ADDR from Controller 404. Further, control signal WR ADDR may be offset, such that the separate 128 bit data blocks within each of the 18 cache lines of Register Array 408 may be individually addressed. Thus, data received from Data Bus 434 may be latched into any one of the 144 separately addressable, 128 bit storage locations within Register Array 408.

Two separate read control signals, RD ADDR and RD BLOCK ADDR, are provided by Controller 404 to access each of the 128 data blocks contained within Register Array 408 when Data Cache Interface 310 is being used in queue mode. Signal RD ADDR may be characterized as two control signals: the first (e.g., "even") read control signal being arranged to access each consecutive 128 bit location within Register Array 408, such that control signal RD ADDR is incremented by 2 for each consecutive data access; and a second (e.g., "odd") read control signal (not shown) existent within Data Cache Interface-B 310 that is also incremented by 2. The base address of the "even" read control signal, for example, starts from an even address, while the base address of the "odd" read control signal (not shown) starts from an odd address. Thus, data blocks from the first register array, for example, would be accessed consecutively using the "even" RD ADDR control signal, while data blocks from the second register array would be accessed consecutively using the "odd" RD ADDR control signal.

The RD BLOCK ADDR control signal is similar to the RD ADDR signal, except that the value of the read address represented by RD BLOCK ADDR may be offset to any integer value between, for example, 1 and 8 as defined by signal OFFSET. Thus, if consecutive 128 bit data blocks are desired to be accessed from Register Array 408, then an offset of 1 is used. Alternatively, for example, if three of the 128 bit data blocks in a particular cache line are not desired, then an offset of 3 may be used to "skip over" the three un-desired data blocks. In this way, an integer number of data blocks within each cache line may be accessed, or "skipped over", and subsequently allowed to be overwritten during a write phase of Register Array 408. Similarly, an integer offset of 8 would be used to "skip over" one entire cache line, given that a 128 bit data block size is being used.

Each of control signals WR ADDR, RD ADDR, and RD BLOCK ADDR are externally controlled by signals WRITE, READ, BLOCK, and BYPASS/QUEUE emanating from Transaction Processor 302 via Control Bus 312 of FIG. 3. When signal WRITE is held at a logic high while the logic value of signal BYPASS/QUEUE indicates that queue mode is active, for example, WR ADDR is incremented by Controller 404, thus allowing data received from Cache Data Bus 316 to be consecutively written into Register Array 408. When signal READ is held at a logic high while the logic value of signal BYPASS/QUEUE indicates that queue mode is active, for example, RD ADDR is incremented, such that data may be consecutively transferred from Register Array 408 to Bus 422. In both read and write access from/to Register Array 408, signals RD and WR are generated by Controller 404 to "clock" data out of/into Register Array 408.

During a block operation of queue mode, signal BLOCK is held at a logic high and RD BLOCK ADDR is incremented by the integer offset defined by signal OFFSET, such that an entire cache line, or a portion thereof, may be skipped over when not of interest. Not of interest cache line data within Register Array 408 may occur, for example, when the front side bus read request was for a partial cache line, or when the cache data has been stalled after starting a cache read. In such an instance, the data accessed by RD BLOCK ADDR is subsequently applied to Bus 424 and signal CONTROL #1 is appropriately selected by Controller 404, such that Multiplexer 410 applies the data present at Bus 424 to Bus 428 to be ultimately applied to DATA OUT-A 314. Use of signal OFFSET, therefore, obviates the need for dead cycles, i.e., No Operation (NOP) cycles, to be used on DATA OUT-A 314 to "skip over" unwanted data. In other words, the pointer to desired data, e.g., RD BLOCK ADDR, is always pointing to valid data through the use of signal OFFSET, so that valid data is ultimately presented to DATA OUT-A 314 for every read cycle while in block operation of queue mode. In such an instance, a variable number of data blocks for each partial cache line access may be consecutively retrieved from Register Array 408 without producing dead cycles on DATA OUT-A 314.

Alternatively, when signal BLOCK is held at a logic low while the logic value of signal BYPASS/QUEUE indicates that queue mode is active, RD ADDR is incremented (e.g., by 2) such that the "even" data blocks within the cache line may be consecutively transferred from Register Array 408, while the corresponding RD ADDR signal of Data Cache Interface-B 310 is also incremented (e.g., by 2) to consecutively transfer the "odd" data blocks from Register Array 408 of Data Cache Interface-B 310. In such an instance, the data accessed by RD ADDR is subsequently applied to Bus 422 and signal CONTROL #1 is appropriately selected by Controller 404, such that Multiplexer 410 applies the data at Bus 422 to Bus 428.

Thus, it can be seen that a data path may be established through Data Cache Interface 310, which exhibits a programmable amount of delay, whereby the input data path is broken out into 4 separate data paths and subsequently multiplexed back down into a single, output data path. The first of the data paths providing zero delay with respect to one master clock cycle, the second data path providing a delay of substantially one master clock cycle, and data paths 3 and 4 providing any amount of delay. Multiplexer 410 is operative to select between slow bypass path 420, sequentially queued data path 422, or block offset data path 424, while Multiplexer 414 is operative to select between fast bypass path 418, or the data path selected by Multiplexer 410.

Figure 5:
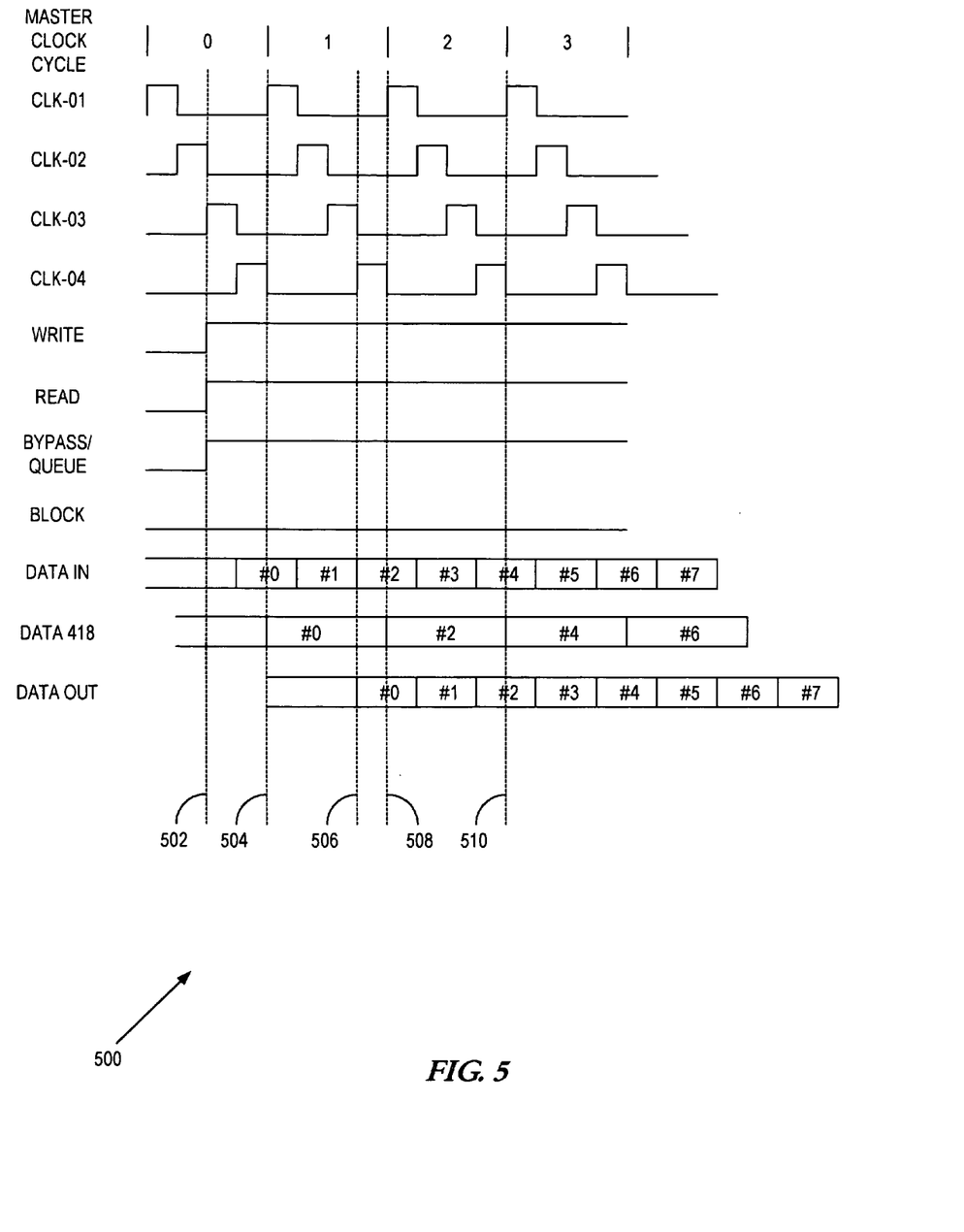
FIG. 5 illustrates an exemplary fast bypass mode timing diagram in accordance with the present invention.

Operation of Data Cache Interface 310 may be further illustrated through use of the timing diagrams of FIGS. 5-8. As discussed above, four separate data paths exist within Data Cache Interface 310, each of which having a different data in/data out delay relative to the master clock cycle. FIG. 5 is illustrative of the data throughput timing achieved via fast bypass mode in accordance with the present invention. Clock signals CLK-01 through CLK-04 represent the four phases of clock signals that are operative within a master clock cycle. At time 502, control signals WRITE, READ, and BYPASS/QUEUE are each asserted to logic high, while control signal BLOCK is deasserted to logic low. Thus, fast bypass mode is activated by Transaction Processor 302 of FIG. 3, whereby Multiplexer 414 selects data path 418 via signal CONTROL #2.

During MASTER CLOCK CYCLE 1, signal DATA IN #0, representing data present at cache data bus DATA IN-A 316, is stable at some time prior to time 504. At time 504, the rising edge of CLK-01 latches DATA IN #0 into Register 402, making DATA 418 #0 available on Bus 418 and Bus 430 via Multiplexer 414. At time 506, DATA 418 #0 is latched by Register 416 via CLK-04 onto signal DATA OUT #0, which represents data present at DATA OUT-A 314. Thus, it can be seen that data present at DATA IN-A 316 is latched by Data Cache Interface 310 and is made available to DATA OUT-A 314 within a single master clock cycle during fast bypass mode of operation. Subsequent "even" data block transfers, e.g., DATA IN #2 and DATA IN #4, similarly traverse Data Cache Interface 310 at times 508 and 510, whereas "odd" data transfers for DATA IN #1, #3, and #5, for example, are handled via Data Cache Interface-B 310 in identical fashion. Thus, by using a parallel data cache interface, the data transfer rate on data busses 314 and 316 is twice the data transfer rate of the individual data cache interface devices.

Figure 6:
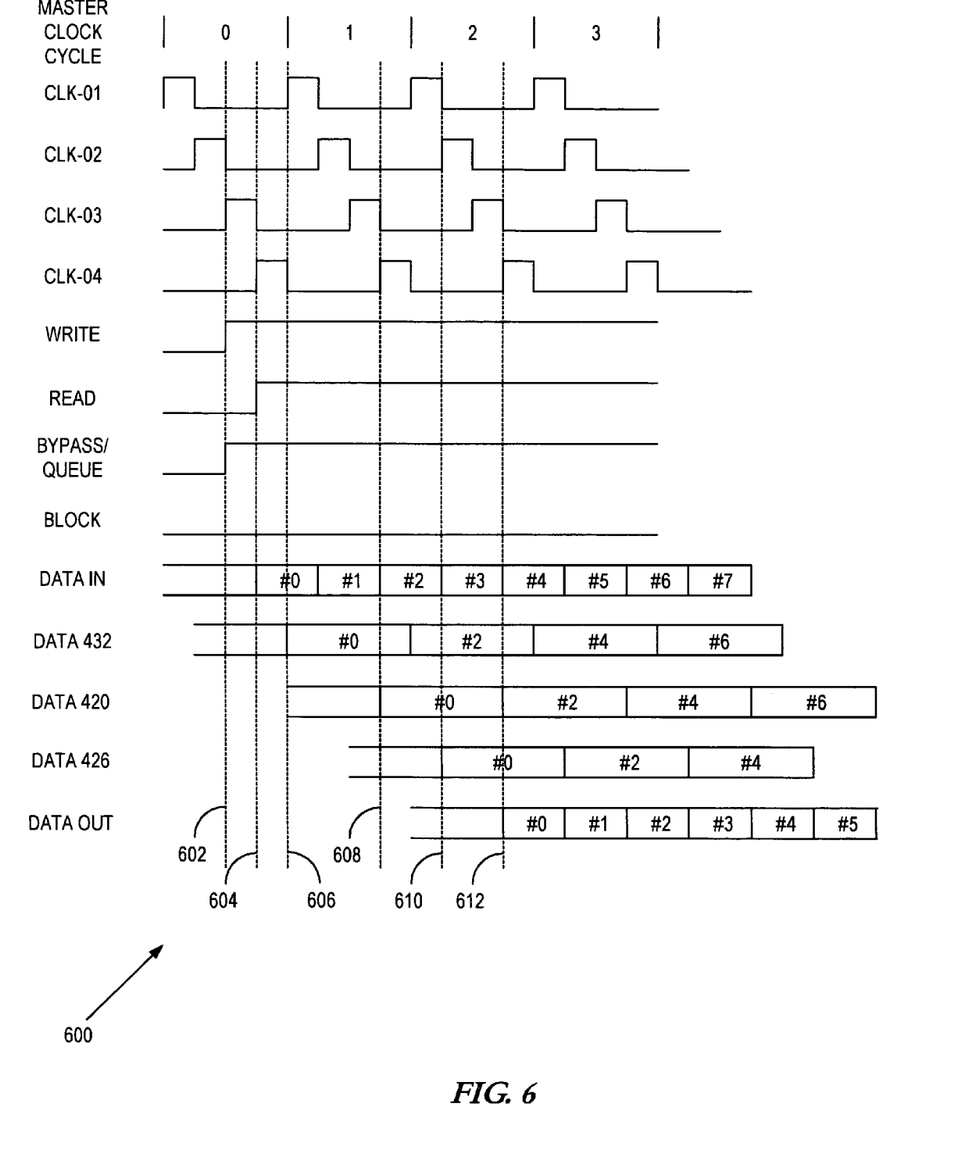
FIG. 6 illustrates an exemplary slow bypass mode timing diagram in accordance with the present invention.

FIG. 6 is illustrative of the data throughput timing achieved via slow bypass mode in accordance with the present invention. Clock signals CLK-01 through CLK-04 represent the four phases of clock signals that are operative within a master clock cycle. At time 602, control signals WRITE and BYPASS/QUEUE are each asserted to logic high, while control signal BLOCK is deasserted to logic low. At time 604, signal READ is then asserted to logic high, whereby slow bypass mode is activated through the delayed assertion of signal READ by Transaction Processor 302 of FIG. 3. Multiplexer 410 selects data path 420 via signal CONTROL #1, while Multiplexer 414 selects data path 426 via signal CONTROL #2.

During MASTER CLOCK CYCLE 1, Signal DATA IN #0, representing data present at cache data bus DATA IN-A 316, is stable at some time prior to time 606. At time 606, the rising edge of CLK-01 latches DATA IN #0 into Register 402, making DATA 432 #0 available on data path 432. At time 608, DATA 420 #0 is latched by Register 406 via CLK-04 onto data paths 420 and 428 via Multiplexer 410. During MASTER CLOCK CYCLE 2 at time 610, DATA 426 #0 is latched by Register 412 onto data paths 426 and 430 via Multiplexer 414. At time 612, DATA 426 #0 is latched onto DATA OUT #0, which represents data present at DATA OUT-A 314. Thus, it can be seen that data present at DATA IN-A 316 is latched by Data Cache Interface 310 and is made available to DATA OUT-A 314 within back to back master clock cycles, e.g., MASTER CLOCK CYCLES 1 and 2, during slow bypass mode of operation. Subsequent "even" data block transfers, e.g., DATA IN #2 and DATA IN #4, similarly traverse Data Cache Interface 310, whereas "odd" DATA IN #1, #3, and #5, for example, are handled via Data Cache Interface-B 310. Thus, by using a parallel data cache interface, the data transfer rate on data busses 314 and 316 is twice the data transfer rate of the individual data cache interface devices.

Figure 7:
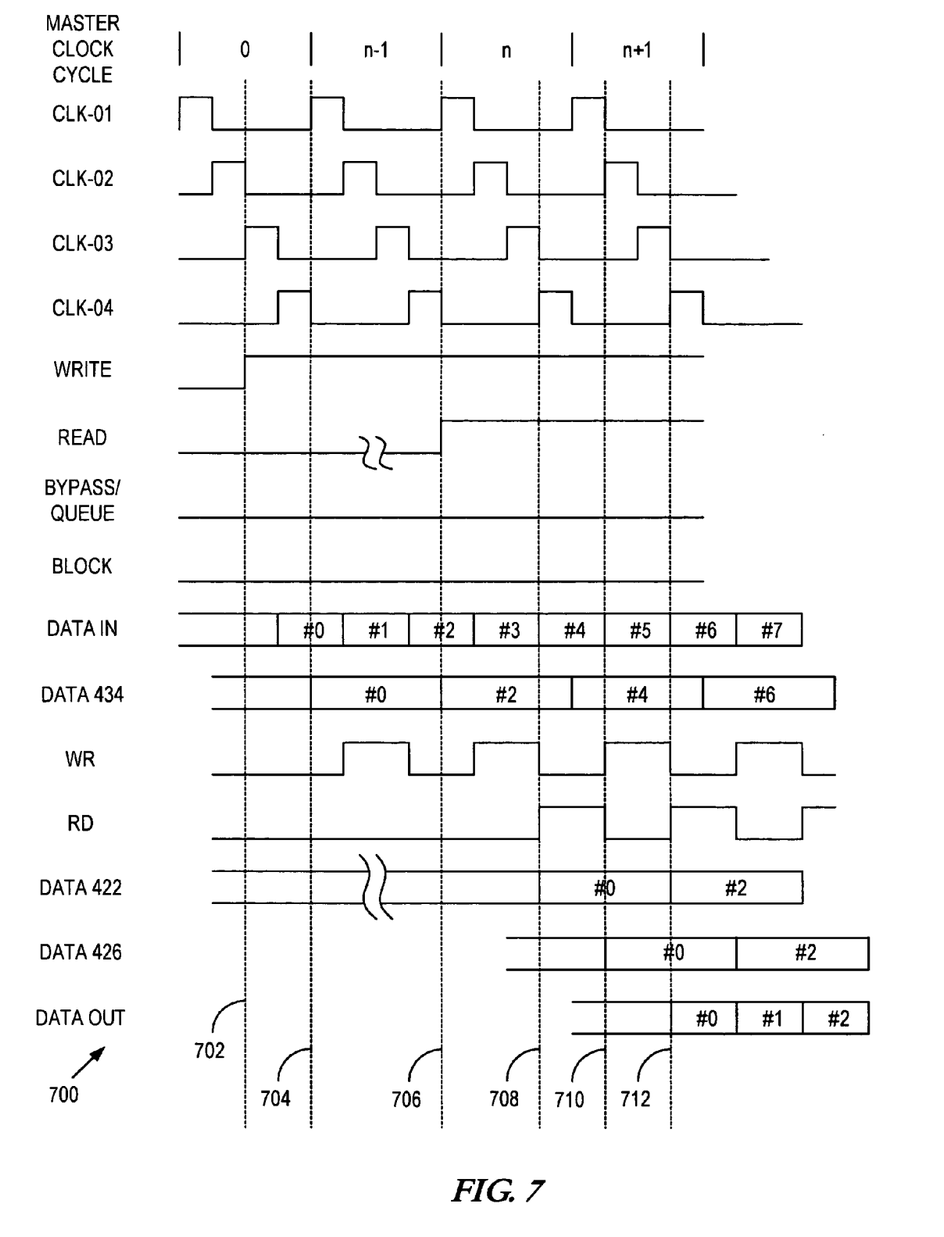
FIG. 7 illustrates an exemplary consecutive queue mode timing diagram in accordance with the present invention.

FIG. 7 is illustrative of the data throughput timing achieved via the consecutive queue mode in accordance with the present invention. Clock signals CLK-01 through CLK-04 represent the four phases of clock signals that are operative within a master clock cycle. At time 702, control signal WRITE is asserted to logic high, thus enabling input data from DATA IN-A 316 to be latched into the input queue, e.g., Register Array 408. Control signals READ, BYPASS/QUEUE, and BLOCK are each deasserted to logic low, causing Multiplexer 410 to select data path 422 via signal CONTROL #1 and causing Multiplexer 414 to select data path 426 via signal CONTROL #2.

Signal DATA IN #0, representing data present at cache data bus DATA IN-A 316, is stable at some time prior to time 704. At time 704, the rising edge of CLK-01 in MASTER CLOCK CYCLE 1 latches DATA IN #0 onto data bus 434, where the subsequent rising edge of signal WR latches DATA 434 into Register Array 408 according to the address selected by signal WR ADDR. Similarly, subsequent "even" data input, e.g., DATA IN #2, DATA IN #4, etc., sequentially loads into Register Array 408. It should be noted that similar operation within Data Cache Interface-B 310 provides "odd" data storage, e.g., DATA IN #1, DATA IN #3, etc. within its respective input queue.

After n−1 master clock cycles have occurred, control signal READ is asserted to logic high at time 706, signalling the need for data previously stored within Register Array 408 to be made available from Data Cache Interface 310. At time 708, DATA 422 #0 is clocked out of Register Array 408 using signal RD, thus making DATA 422 #0 available on data paths 422 and 428 via Multiplexer 410. At time 710, DATA 426 #0 is latched by Register 412 via CLK-02 onto data paths 426 and 430 via Multiplexer 414. At time 712, DATA 426 #0 is latched onto DATA OUT #0, which represents data present at DATA OUT-A 314. Thus, it can be seen that data present at DATA IN-A 316 is latched by Data Cache Interface 310 and is made available to DATA OUT-A 314 within a programmable number of master clock cycles during consecutive queue mode of operation. Subsequent "even" data block transfers, e.g., DATA IN #2 and DATA IN #4, similarly traverse Data Cache Interface 310, whereas "odd" DATA IN #1, #3, and #5, for example, are handled via Data Cache Interface-B 310. Thus, by using a parallel data cache interface, the data transfer rate on data busses 314 and 316 is twice the data transfer rate of the individual data cache interface devices.

Figure 8:
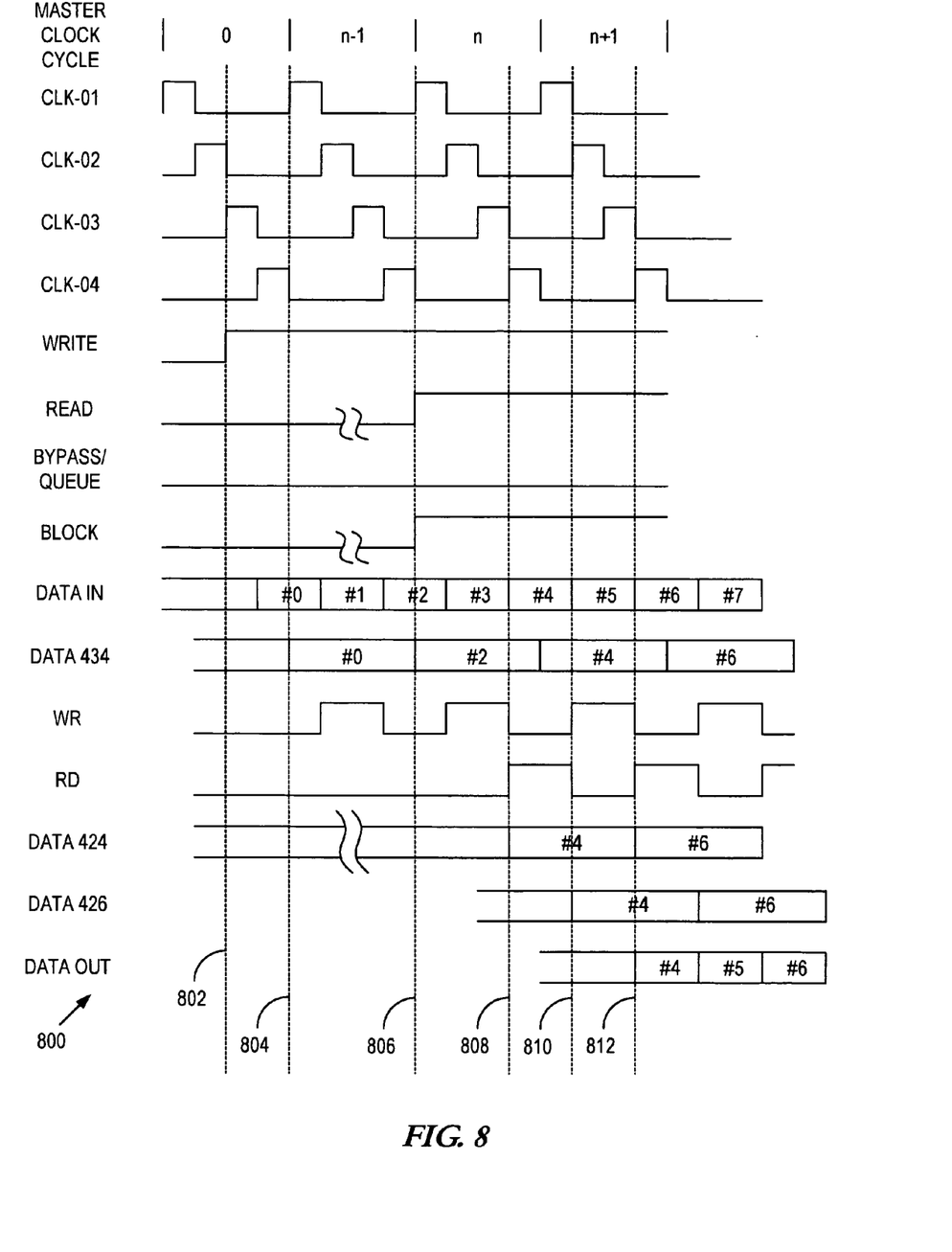
FIG. 8 illustrates an exemplary block queue mode timing diagram in accordance with the present invention.

FIG. 8 is illustrative of the data throughput timing achieved via the block queue mode in accordance with the present invention. Clock signals CLK-01 through CLK-04 represent the four phases of clock signals that are operative within a master clock cycle. At time 802, control signal WRITE is asserted to logic high, thus enabling input data from Data In-A 316 to be latched into the input queue, e.g., Register Array 408.

Signal DATA IN #0, representing data present at cache data bus DATA IN-A 316, is stable at some time prior to time 804. At time 804, the rising edge of CLK-01 in MASTER CLOCK CYCLE 1 latches DATA IN #0 onto data bus 434, where the subsequent rising edge of signal WR latches DATA 434 into Register Array 408 according to the address selected by signal WR ADDR. Subsequent "even" data input, e.g., DATA IN #2, DATA IN #4, etc., sequentially loads into Register Array 408. It should be noted that similar operation within Data Cache Interface-B 310 provides "odd" data storage, e.g., DATA IN #1, DATA IN #3, etc. within its respective input queue.

After n−1 master clock cycles have occurred, control signals READ and BLOCK are asserted to logic high at time 806, signalling the need for data previously stored within Register Array 408 to be made available from Data Cache Interface 310, whereby read addresses supplied by signal RD ADDR may contain an integer offset defined by signal OFFSET. Multiplexer 410 selects data path 424 via signal CONTROL #1 and Multiplexer 414 selects data path 426 via signal CONTROL #2.

Taking an integer offset of 4, for example, DATA 422 #4 is clocked out of Register Array 408 using signal RD, thus making DATA 422 #4 available on data paths 424 and 428 via Multiplexer 410 at time 808. Since signal OFFSET indicates an offset of 4, data blocks 0-3 of the particular cache line addressed by RD ADDR within Register Array 408 are essentially bypassed. At time 810, Data 426 #4 is latched by Register 412 via CLK-02 onto data paths 426 and 430 via Multiplexer 414. At time 812, DATA 426 #4 is latched onto DATA OUT #4, which represents data present at DATA OUT-A 314. Thus, it can be seen that data present at DATA IN-A 316 is latched by Data Cache Interface 310 and block offsets to the latched data are then made available to DATA OUT-A 314 within a programmable number of master clock cycles during block queue mode of operation. Subsequent "even" data block transfers, e.g., DATA IN #6, similarly traverse Data Cache Interface 310, whereas "odd" DATA IN #5 and #7, for example, are handled via Data Cache Interface-B 310. Thus, by using a parallel data cache interface, the data transfer rate on data busses 314 and 316 is twice the data transfer rate of the individual data cache interface devices.

Thus it can be seen that block queue mode allows data stored within Register Array 408 to be retrieved at virtually any offset that may be desired. Signal WR ADDR is used to access data at cache line boundaries within Register Array 408, whereas signal OFFSET may be used to offset signal WR ADDR to any data block boundary within the respective cache line.

Figure 9:
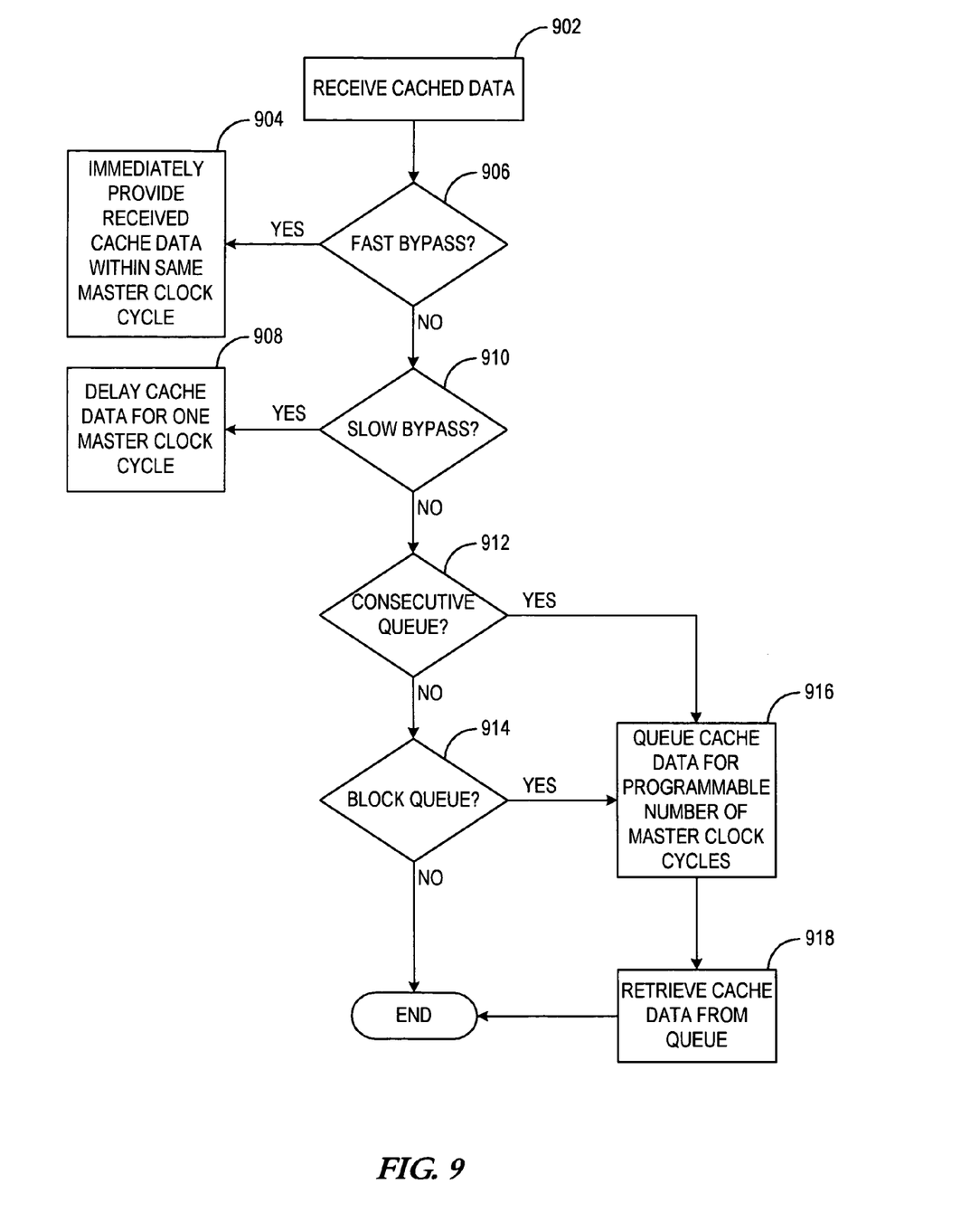
FIG. 9 illustrates an exemplary flow diagram of a method in accordance with the present invention.

FIG. 9 illustrates a flow diagram of an exemplary method in accordance with the present invention. In step 902, cached data is received by Data Cache Interface 310. If fast bypass mode is selected in step 906, then the cached data is immediately provided within the same master clock cycle that it was received in by Data Cache Interface 310 as in step 904. If slow bypass mode is preferred over fast bypass mode as in step 910, then step 908 latches the cached data for one master clock cycle and then forwards the data onto the receiving entity during the next master clock cycle.

If, on the other hand, queue mode of operation is requested, then step 912 determines whether consecutive queue mode is desired. If not, then step 914 determines if block queue mode is desired. An affirmative answer to either step 912 or 914 causes the received cached data to be stored within a data queue, e.g., Register Array 408, as in step 916. The queued data is then retrieved from the data queue in step 918 either consecutively, as in consecutive queue mode, or using a block offset in block queue mode.

In conclusion, a method and apparatus has been presented that allows data to traverse a cache interface device in one of four transfer modes. A fast bypass mode provides received cache data within the same master clock cycle as it was received, whereas a slow bypass mode provides received cache data within the subsequent master clock cycle. A queue mode provides a programmable amount of delay to be used by the cache interface device, whereby consecutive queue mode provides a First In First Out (FIFO) operation to consecutively retrieve queued data. A block queue mode, on the other hand, provides a method to retrieve queued data using a programmable offset so as to enable partial cache line retrieval.

Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of data transfer using programmable delay, comprising:

providing a plurality of alternative data paths, each of the data paths being programmably selectable based on a state of one or more control signals, and each of the data paths providing a different data transfer delay to reach an output register;

receiving a data block at a first instant in time within a first master clock cycle;

determining one of a plurality of master clock cycles to be used as a second master clock cycle;

programmably selecting one of the alternative data paths based on the state of the one or more control signals to utilize its corresponding data transfer delay in providing the data block to the output register to accommodate a data storage mechanism between an external cache and a front side bus, wherein at least one of the data transfer delays comprises an amount of time greater than the first master clock cycle; and transmitting the received data block from the output register at a second instant in time within the second master clock cycle.

2. The method according to claim 1, wherein the second master clock cycle is selected to be the same as the first master clock cycle.

3. The method according to claim 2, wherein the data transfer delay minimizes the difference between the first and second instants in time.

4. The method according to claim 1, wherein the second master clock cycle is selected to be different than the first master clock cycle.

5. The method according to claim 4, wherein the second master clock cycle is selected to be immediately subsequent in time to the first master clock cycle.

6. The method according to claim 4, wherein an amount of time equal to at least one master clock cycle separates the second master clock cycle from the first master clock cycle.

7. The method according to claim 6, wherein data queuing is used to provide the amount of separation time equal to the at least one master clock cycle.

8. The method according to claim 7, wherein write addressing is used to store a plurality of received data blocks, wherein the plurality of received data blocks represent components of at least one cache line.

9. The method according to claim 8, wherein read addressing is used to retrieve the plurality of received data blocks.

10. The method according to claim 9, wherein consecutive read addressing is used to retrieve whole cache lines.

11. The method according to claim 9, wherein offset read addressing is used to consecutively retrieve data blocks representative of partial cache lines.

12. An apparatus coupled to a data storage mechanism between an external cache and a front side bus, the apparatus comprising:
an output register;
an input register configured to receive a data block;
a plurality of alternative data paths each suitable for transferring the data block from the input register to the output register in accordance with a master clock signal;
a controller having inputs to receive control signals, wherein different states of the control signals respectively correspond to different delay modes to accommodate the data storage mechanism, and having outputs to activate one of the plurality of alternative data paths to programmably effect a desired one of the delay modes based on the state of the control signals; and
wherein the activated one of the data paths comprises means for delaying the transfer of the data block to the output register for a duration different than a transfer delay of the other data paths, and wherein at least one of the delay modes delays transfer of the data block by an amount of time greater than a single cycle of the master clock signal.

13. The apparatus as in claim 12, wherein one of the plurality of alternative data paths comprises a fast bypass data path comprising a multiplexer coupled to the controller to enable the multiplexer to directly transfer the data block from the input register to the output register in response to the control signals indicating a fast bypass delay mode.

14. The apparatus as in claim 12, wherein one of the plurality of alternative data paths comprises a slow bypass data path comprising:
one or more intermediate registers coupled between the input register and the output register; and
one or more multiplexers coupled to the controller to enable the one or more intermediate registers to delay the transfer of the data block from the input register to the output register relative to the master clock signal in response to the control signals indicating a slow bypass delay mode.

15. The apparatus as in claim 12, wherein one of the plurality of alternative data paths comprises a queue data path comprising:
a register array coupled to the input register to store the data block and configured to output the stored data block in response to a triggering control signal;
one or more intermediate registers coupled between the register array and the output register; and
means for enabling the transfer of the data to be delayed from the register array to the output register relative to the master clock signal in response to the control signals indicating a queue delay mode.

16. A method comprising:
providing a plurality of alternative data paths for transferring a data block from an input to an output of a device in accordance with a master clock signal;
providing a plurality of programmable delay modes, and wherein at least one of the programmable delay modes delays transfer of the data block by an amount of time greater than a single cycle of the master clock signal to accommodate a data storage mechanism between an external cache and a front side bus;
receiving the data block at the input of the device;
selecting one of the different data paths in which to direct the data block as a function of which of the configurable delay modes is active; and
delaying delivery of the data block to the output of the device for a time that is dependent upon the selected data path that has been selected as a function of the active configurable delay modes.

* * * * *